No. 887,616. PATENTED MAY 12, 1908.
J. G. FIELD.
SPEED INDICATOR.
APPLICATION FILED DEC. 21, 1907.

2 SHEETS—SHEET 1.

WITNESSES
Geo. W. Naylor

INVENTOR
John G. Field
BY Munn & Co.
ATTORNEYS

No. 887,616. PATENTED MAY 12, 1908.
J. G. FIELD.
SPEED INDICATOR.
APPLICATION FILED DEC. 21, 1907.

2 SHEETS—SHEET 2.

WITNESSES

INVENTOR
John G. Field
BY Munn & Co.
ATTORNEYS

UNITED STATES PATENT OFFICE.

JOHN GERHARD FIELD, OF THOMPSON, IOWA.

SPEED-INDICATOR.

No. 887,616.  Specification of Letters Patent.  Patented May 12, 1908.

Application filed December 21, 1907. Serial No. 407,477.

*To all whom it may concern:*

Be it known that I, JOHN G. FIELD, a citizen of the United States, and a resident of Thompson, in the county of Winnebago and State of Iowa, have invented a new and Improved Speed-Indicator, of which the following is a full, clear, and exact description.

This invention is an improvement in speed indicators, and has in view the provision of suitable mechanical means for indicating the relationship between the speed of the device of which the speed is to be determined, and the speed of means, as a motor, moving at a predetermined velocity.

The invention also contemplates the provision of means for automatically stopping the motor when the movement of the device being tested stops.

The invention further resides in certain novel features of construction and combination of parts as will be hereinafter particularly described and claimed.

Reference is to be had to the accompanying drawings forming a part of this specification, in which similar characters of reference indicate corresponding parts in all the views.

Figure 1:
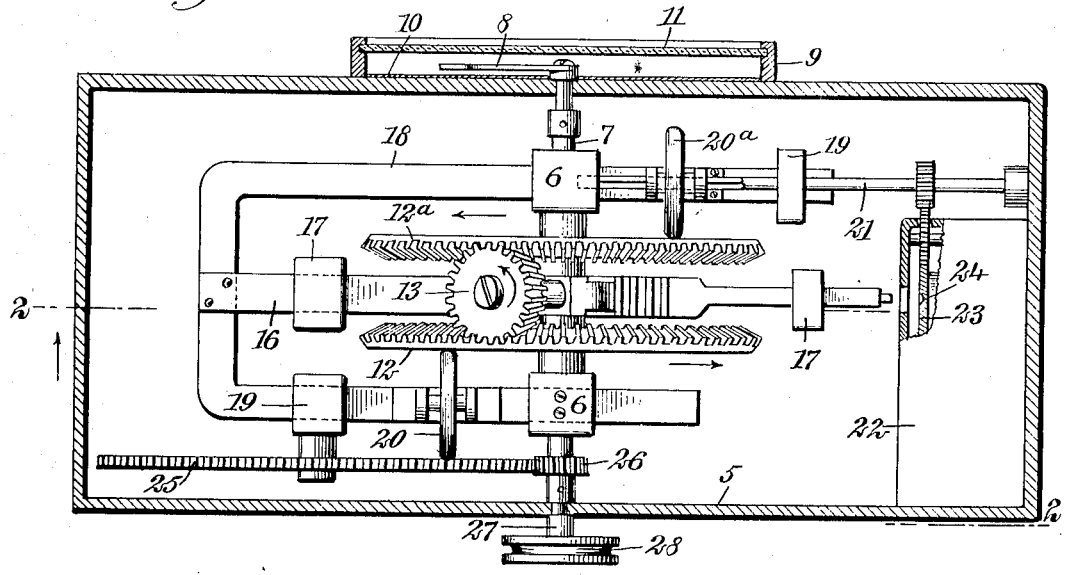
Figure 2:
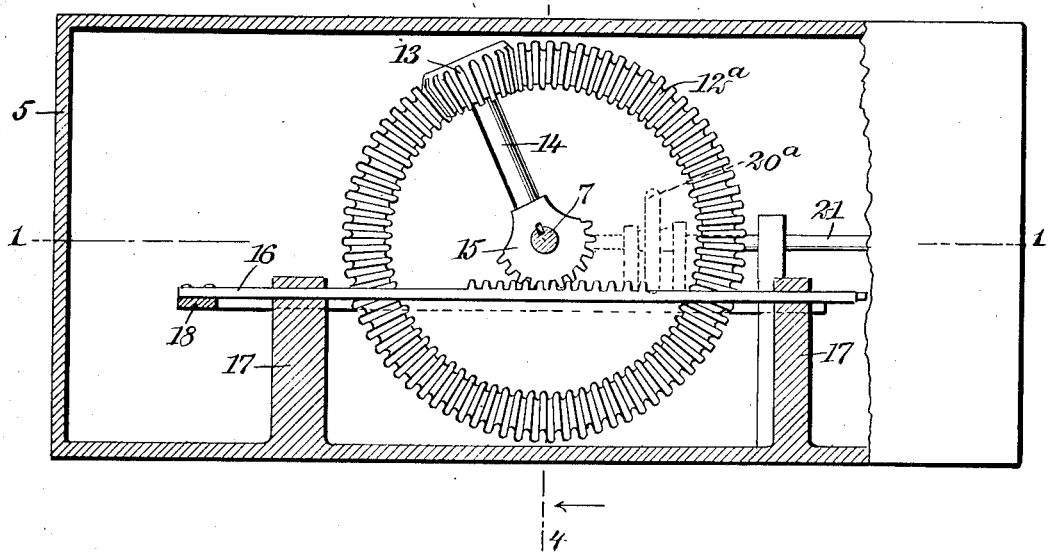
Figure 3:
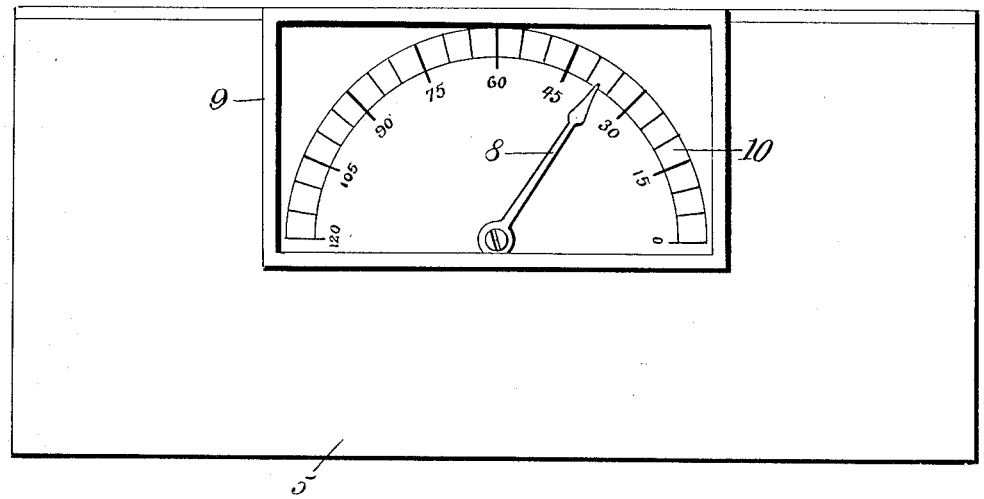
Figure 4:
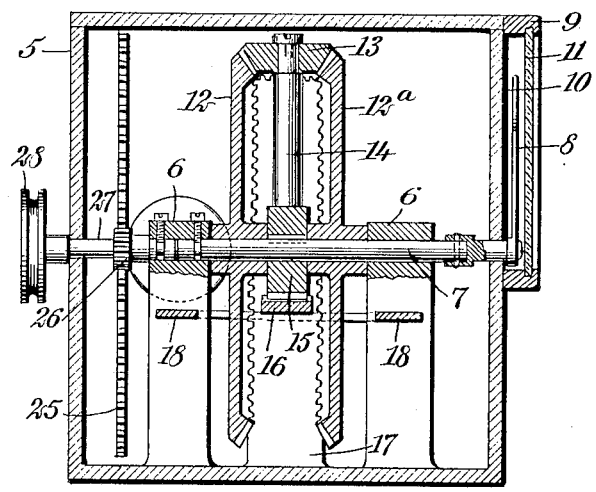

Figure 1 is a sectional plan substantially on the line 1—1 of Fig. 2, of one embodiment of my invention; Fig. 2 is a longitudinal vertical section through the same substantially on the line 2—2 of Fig. 1, looking in the direction of the arrow; Fig. 3 is a side elevation of the indicator, showing the graduated scale or dial and pointer; and Fig. 4 is a cross-section substantially on the line 4—4 of Fig. 2, looking in the direction of the arrow.

The working mechanism of the indicator is preferably inclosed in a suitable casing 5, having bearing-supports 6, in which a shaft 7 is journaled, one end of the same being attached to a hand or pointer 8 arranged at the outside of the casing in a box 9, and adapted to traverse a scale or dial 10; the pointer and scale being protected by a transparent covering 11 forming the front of the box. Between the bearings 6 are journaled on the shaft 7, two opposed bevel gears 12 and 12ª, both of which are in mesh with an intermediate bevel pinion 13, journaled on the outer end of a radially-arranged shaft 14, the latter being rigidly secured to the shaft 7 through the intermediary of a segmental gear 15. The gear 15 is in mesh with a rack-bar 16, slidable on suitable supports 17, arranged at opposite sides of the bevel gears, and is rigidly attached to a U-shaped frame 18 which is also slidably mounted in supports 19 and in the supports 6. The arms of the frame 18 carry bearings, in which are respectively journaled the supporting-shaft of a friction-wheel 20, and the supporting-shaft 21 of a friction-wheel 20ª, the said friction-wheels contacting with the gears 12 and 12ª respectively at the opposite sides of the shaft 7. The shaft 21 is slidably splined to the wheel 20ª, and is driven by any suitable means from a motor 22, located in one corner of the casing, and ordinarily spring or electrically operated. The motor embodies in its construction a gear or other revoluble member 23, which, as shown, has a depression 24 in one face in alinement with the reduced free end of the rack-bar 16.

In addition to the contact with the bevel gear 12 by the friction-wheel 20, the latter also contacts with a gear 25, which is revolubly mounted in the casing, and is of approximately the same diameter as the gears 12 and 12ª. The gear 25 is driven by a pinion 26 fixed to a shaft 27, in alinement with the shaft 7, and provided exteriorly of the casing with a pulley 28 or other suitable means for transmitting the movement of the device, such as the shaft, wheel or axle, of which the speed is to be determined.

In the operation of the indicator, the motor 22 drives the shaft 21 and the friction-wheel 20ª at a uniform and known angular velocity, and which in turn causes the bevel gear 12ª to be set in motion at or about the same time the device of which the speed is to be indicated, is connected with the pulley 28, and by reason of the intermediary mechanism revolves the gear 12 in the opposite direction; the direction of rotation of these gears, in the particular embodiment of the invention illustrated, being indicated by the arrows in Fig. 1. If the velocity of the device of which the speed is to be determined becomes steady or uniform, the pinion 13 will remain stationary. If this velocity increases, the pinion 13 will travel in the direction of the motor, and will by means of the segmental gear 15, bar 16 and frame 18, shift the friction-wheel 20 outwardly toward the circumference of the gear-wheel 12, and at the same time move the friction-wheel 20ª toward the center of the gear 12ª, thereby compensating for this increase in speed, and again bring the gears 12 and 12ª to a uniform movement. If the speed of the device decreases, the reverse operation obviously takes place, and the gears again assume the same angular velocity.

The circumferential position of the pinion 13 accordingly measures the relationship between the speed of the motor and the speed of the device to which the indicator is applied, and since the shafts 14 and 7, and the hand 8, are rigidly attached, the speed of the device will be observed by looking at the position of the hand on the dial; the latter of course being graduated in any suitable units. Should the device which is being tested, stop, the pinion 13 would move in a direction to project the rock-bar into engagement with the moving wheel, or part of the motor, and thereby automatically bring the motor to a stop.

It is apparent that the construction hereinbefore described, and shown in the accompanying drawings, may be modified in numerous particulars without departing from the nature of my invention as pointed out in the annexed claims.

Having thus described my invention, I claim as new and desire to secure by Letters Patent:

1. In a speed indicator, a motor, means adapted to be driven by the device of which the speed is to be determined, indicating means operatively connected with the motor and with the first mentioned means, and means for stopping the motor actuated by the indicating means.

2. In a speed indicator, two opposed revoluble members, a third member in engagement with said members, friction-wheels in contact with the outer faces of said opposed members adapted to drive them in opposite directions, and means controlled by the third member for shifting the wheels in reverse directions with respect to the centers of said members.

3. In a speed indicator, two opposed members adapted to be driven in opposite directions, a third member located between and in operative engagement with both of said members, means operated by said third member for automatically maintaining the speeds of the first two members substantially uniform, and an indicating device actuated by the third member.

4. In a speed indicator, two opposed members, a third member in operative engagement with said members, friction-wheels in contact with the outer faces of said opposed members, and means actuated by the third member for shifting said friction-wheels to maintain said members at the same speed.

5. In a speed indicator, two opposed members, a third member in operative engagement with both of said members, and means for maintaining said opposed members at the same speed, automatically controlled by the third member.

6. In a speed indicator, two opposed members, a third member in operative engagement with said members, indicating means controlled by the third member, and means for maintaining the speed of said opposed members substantially the same, controlled by said third member.

7. In a speed indicator, a motor, two opposed members, one of which is driven by the motor means for driving the other member by the device of which the speed is to be determined, a third member in operative engagement with said opposed members, and means controlled by said third member for maintaining the said members at the same speed.

8. In a speed indicator, a motor, two opposed members, one of which is driven by the motor, means for driving the other member by the device of which the speed is to be determined, a third member in operative engagement with said opposed members, and means actuated by the third member for stopping the motor.

9. In a speed indicator, two opposed revoluble members, a third member operatively engaged with both of said members, a frame, friction-wheels in contact with the outer faces of said opposed members and carried by said frame, and means controlled by said third member for shifting the frame.

10. In a speed indicator, two opposed gears, an intermediate pinion in mesh with said gears, means controlled by said pinion for maintaining the gears at the same speed, and indicating means actuated by the pinion.

11. In a speed indicator, a shaft, two opposed gears journaled on the shaft, a radially-arranged shaft secured to the first-named shaft between said gears, a pinion journaled on the radially-arranged shaft, means actuated by the pinion through said radially-arranged shaft for maintaining the gears at substantially the same speed, and a pointer carried by the first mentioned shaft.

12. In a speed indicator, two opposed wheels, a third wheel intermediate said wheels and in operative engagement therewith, a pointer actuated by the movement of the third wheel about the circumferences of the two opposed wheels, a slidable frame, friction-wheels in contact with the outer faces of said wheels and carried by said frame, and means for sliding the frame by the movement of the third wheel about the circumferences of the two opposed wheels.

13. In a speed indicator, a shaft having a pointer attached thereto, two opposed wheels journaled on the shaft, a third wheel in operative engagement with the two opposed wheels and carried by said shaft, a frame, friction-wheels carried by the frame and in contact with the side faces of the opposed wheels, and means for shifting the frame to maintain the opposed wheels at the same speed, controlled by the movement of the third wheel about the circumferences of the opposed wheels.

14. In a speed indicator, a shaft, two opposed wheels journaled on the shaft, a pointer carried by the shaft, a third wheel carried on the shaft in operative engagement with the two opposed wheels for actuating the pointer, friction-wheels in contact with the side faces of the opposed wheels, and means controlled by the third wheel for shifting the friction-wheels in reverse directions with respect to said shaft, whereby the two opposed wheels are maintained at the same speed.

15. In a speed indicator, a shaft having a pointer secured thereto, two opposed gear-wheels journaled on the shaft, a second shaft secured to the first mentioned shaft intermediate said wheels and having a segmental gear, a pinion journaled on the outer end of said shaft in mesh with the two opposed gears, a slidable frame, a third gear, friction-wheels carried by the frame contacting with the side faces of the two opposed gears, one of said friction-wheels being also in contact with the side face of the third gear, and a rack-bar attached to the frame in mesh with the segmental gear for moving said frame as the pinion travels about the circumferences of the two opposed gears.

In testimony whereof I have signed my name to this specification, in the presence of two subscribing witnesses.

JOHN GERHARD FIELD.

Witnesses:
  H. J. INDVIK,
  W. O. HANSON.